May 21, 1968     K. SENNEWALD ET AL     3,384,777

MEANS FOR ROTATING AND FEEDING ELECTRODES

Filed Dec. 7, 1965     3 Sheets-Sheet 1

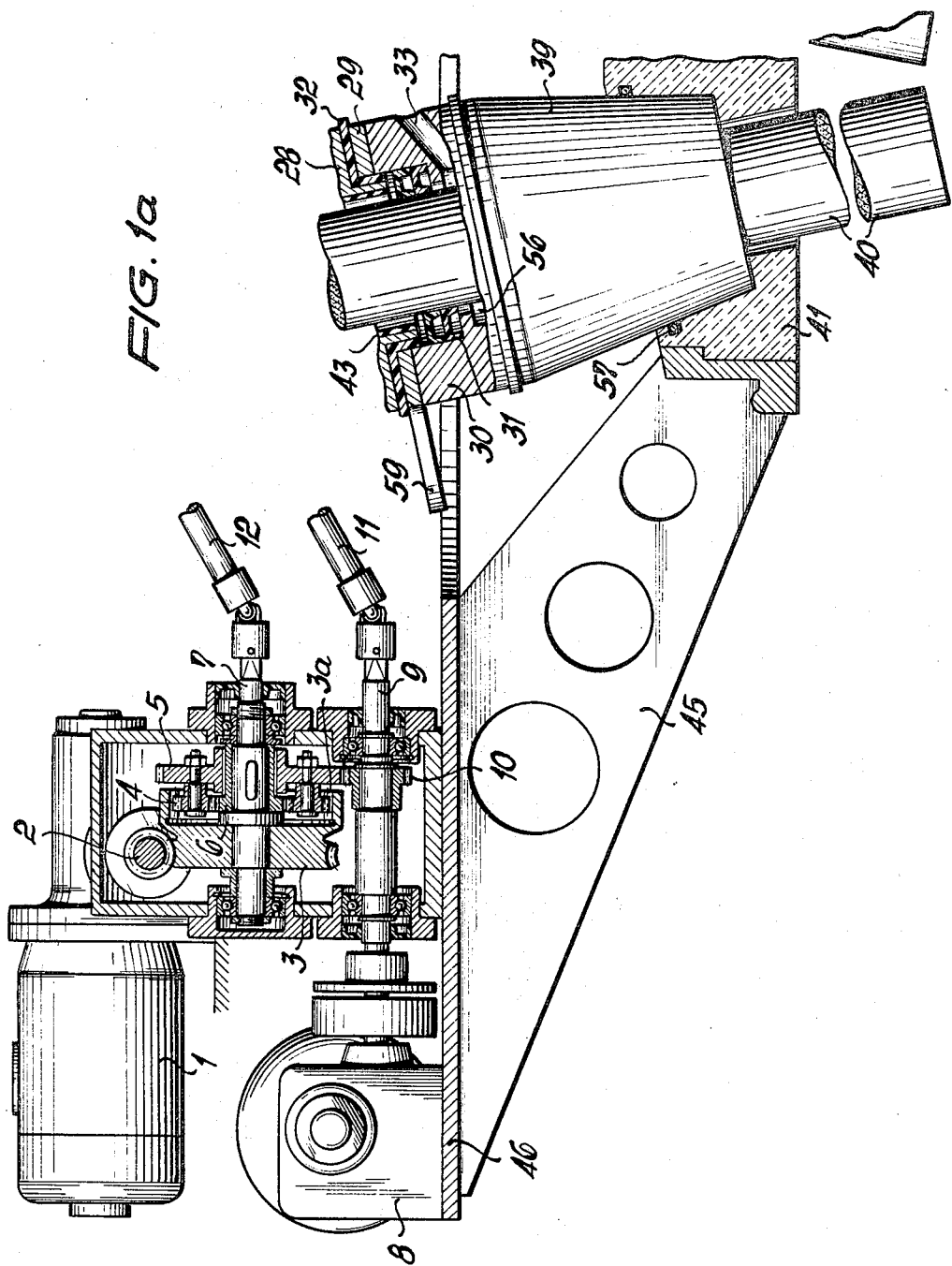

May 21, 1968  K. SENNEWALD ET AL  3,384,777
MEANS FOR ROTATING AND FEEDING ELECTRODES
Filed Dec. 7, 1965
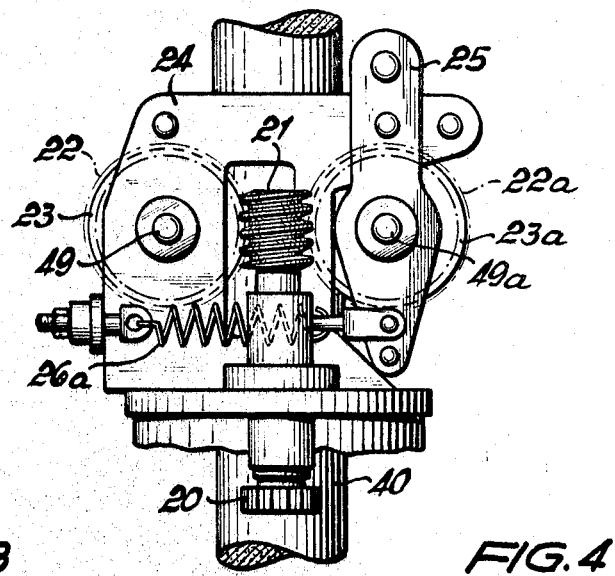
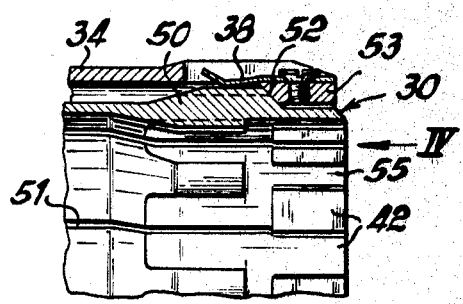
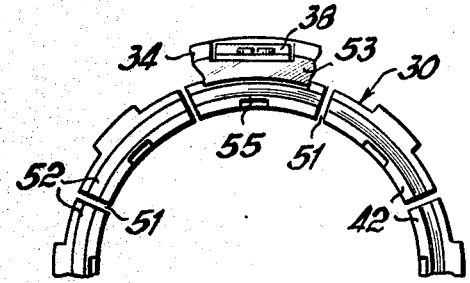
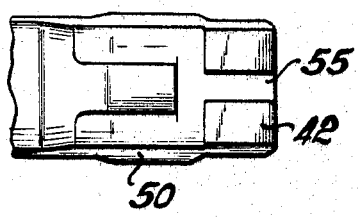

United States Patent Office 3,384,777
Patented May 21, 1968

3,384,777
MEANS FOR ROTATING AND FEEDING ELECTRODES
Kurt Sennewald, Knapsack, near Cologne, Erich Schallus, Cologne-Klettenberg, Helmut Seifert, Hermulheim, near Cologne, and Ludwig Bender, Bruhl, near Cologne, Germany, assignors to Knapsack Aktiengesellschaft, Knapsack, near Cologne, Germany, a corporation of Germany
Filed Dec. 7, 1965, Ser. No. 512,122
Claims priority, application Germany, Dec. 15, 1964, K 54,791
16 Claims. (Cl. 314—40)

The present invention relates to means which during the operation of a heavy current arc established between consumable, e.g. carbon electrodes, automatically impart to such electrodes a rotary motion and concurrently therewith an independent feed motion. The speed at which electrodes rotate can be adjusted to a desired value by conventional electrical and/or mechanical devices and maintained for a prolonged period of time, but for automatic feed control of the electrodes it is necessary to use a separate electric control circuit the details of which need not be discussed as they form no part of the present invention.

Electrode feeders advancing the electrodes of arc arrangements so as to compensate the electrode consumption have been designed since the pioneer days of electrical engineering for electrical arc lamps in use since then. The means necessary to this end were of relatively simple design and corresponded to the relatively uncomplicated operating conditions. Further types of feeders are known to be used in large electrothermal furnaces, e.g. in steel arc furnaces and calcium carbide furnaces, wherein it is necessary not only to compensate electrode consumption but also automatically to maintain predetermine values of voltage, current and/or power. The electrodes must therefore be adapted to permit forward and backward movement. This is generally achieved by hydraulic means and electro-magnetically actuated valves.

In arc arrangements of the type used for the production of acetylene and ethylene by cracking hydrocarbons with a gas, e.g. hydrogen, heated in an electric arc, established between consumable electrodes, further factors can arise which have to be catered for by the electrode motion means.

That is to say while heating pure hydrogen in the electric arc does not incur special difficulties, complications are likely to be encountered with hydrogen containing more hydrocarbon than a certain limit value, or when hydrocarbon alone, e.g. commercial methane, is heated in the electric arc as disclosed, for example in Belgian specification No. 604,989. Carbon deposits will then form on the edges of the electrode tips, i.e. on the external colder areas thereof, with the result that satisfactory continuous operation is impossible.

The present invention is based on the observation that this phenomenon can be avoided when the electrodes are arranged slowly to rotate about their longitudinal axes. The areas of the electrode periphery which are cooler at a given moment and have the carbon deposits thereon, are thus conveyed within the next following moment to the hottest arc zone and are vaporized therein.

The object of the present invention is to provide means which enable electrodes to be continuously rotated at variable speeds about their longitudinal axes and to enable the electrodes concurrently but independently to be fed in an axial direction to compensate electrode consumption.

The apparatus according to the present invention comprises for each separate electrode an electrode holder, disposed in a furnace head common to all of the electrodes and receiving the electrode and a supporting means electrically insulated therefrom; rotation supporting means rotatably mounted on the supporting means and mounting means for holding, feeding and rotating the associated electrode; and, for each electrode, a pair of prime movers fixed to the furnace head, the prime movers being connected to a common differential gear unit from which the electrode rotating and feeding means are driven.

The use of individual prime movers or drive means which are preferably mounted on a common base plate supported by brackets secured to the furnace head, results in a clearly arranged apparatus which as a whole can be mounted on or removed from the arc burning chamber, admits of readily exchanging or supplementing the electrodes, and facilitates control and maintenance.

Preferably the drive means for feeding the electrode comprise a motor driving through a worm, a worm gear rotatably mounted on a drive shaft, the worm gear carrying in coaxial arrangement therewith an internally toothed rim, in which run planet pinions, held in position by an externally toothed wheel, rotatably mounted on a sun wheel with which the pinions also mesh, the sun wheel being fast with the drive shaft. The drive means for rotating the electrode about its longitudinal axis preferably comprise a second motor having a drive shaft which carries a pinion made fast thereto and which is arranged to mesh with the externally toothed wheel.

The two types of motion conferred upon the electrode, i.e. the feed and rotary motions are independent from one another, the rotary motion with adjustable speed being produced continuously and the feed motion being produced intermittently after reception of corresponding pulses emitted by a series-connected control circuit which need not specifically be described.

The rotation supporting means has a worm ring coaxially secured thereto, arranged to be driven by a worm itself driven from the drive shaft of the drive means for rotating the electrode.

Any known means can be employed for varying the speed of rotation, e.g. when the drive means comprise a D.C. motor, by influencing the exciting field of the motor or by using an infinitely variable speed transmission means series-connected to the motor when three-phase current is used.

For producing the electrode feed motion, the rotation supporting means has rotatably secured thereto a second worm ring arranged to be driven by a worm itself driven from the drive shaft of the drive means for feeding the electrode. A coaxial gear rim, fast with the second worm ring is arranged to be engaged by a pinion mounted on a shaft carrying a further worm engaged with two worm gears to whose shafts are secured opposed feed rolls acting on the electrode.

The feed rolls are arranged frictionally to hold the electrode.

One shaft carrying one of the worm gears and its associated feed roll is mounted in a frame fastened to the rotation supporting means, and a second shaft carrying the second worm gear and its associated feed roll is mounted in a second frame pivotally secured to the first frame. Two adjustable tension springs, the ends of which are secured to the first and second frames, respectively, hold the rolls in contact with the electrode.

The feed rolls are profiled to have the shape of two coaxial truncated circular cylindrical cones, with their ends of smaller diameter adjacent each other, optionally spaced apart by a short circular cylindrical member; the feed rolls are provided with an insulating coating, which preferably has a high coefficient of friction.

Theoretically, the electrode is peripherally fixed at four points, i.e. at two points by each feed roll.

In a conical receiving member associated with the furnace head common to all of the electrodes is mounted, for each electrode, a holder supporting means formed with an electrically insulating lining, which in turn carries a coaxially associated contact holder, having a lower thin-walled portion formed with a surrounding edge carrying a conical pressure exerting area. This lower thin-walled portion is provided with parallel longitudinal slits, and is formed on its inside with convex contact surface areas arranged in groups of three.

The function of the convex contact surfaces is to ensure the supply of current to the electrodes.

The lower end of the contact holder has spaced therefrom a surrounding coaxial adapter sleeve, a lower rim portion of which is shaped so as to form an internal ring and is provided with a conical pressure area, and whose upper rim portion is designed as an external flange with the lower flange side resting on one end of an annular or cup spring which surrounds the adapter sleeve and of which the other end bears against a shoulder formed on the inside of the holder supporting means, the inside being electrically insulated by a coating.

In this arrangement, the spring forces the adapter sleeve upwardly so that its conical pressure area formed at its lower, and thicker-walled rim portion exerts pressure on the likewise conical counter area provided at the lower thickened rim portion of the contact holder, with the result that the contact surface areas are elastically pressed against the electrode.

The ring formed in the lower end of the adapter sleeve has pretensioned leaf or plate springs secured thereto which force tongues, formed between the longitudinal slits in the lower portion of the contact holder, and the convex contact areas into elastic contact with the electrode, so as to ensure satisfactory contact of the contact areas with the electrode even if the electrode dimensions differ from the nominal values, which will more especially be the case in the event of the surface of the electrode having local recesses.

For supplying gas to flow along the electrode and to be heated in the electric arc, the contact holder is formed with a radial bore followed by a series-connected annular chamber with packings being disposed above the annular chamber between the contact holder and the electrode.

The packings avoid penetration of the gas supplied which like hydrogen, for example, could form with the outside air a combustible mixture or otherwise harmful mixture.

Further packings are disposed between the furnace head and the holder supporting means and between the holder supporting means with its electrically insulating lining and the contact holder. The packings again prevent gases from penetrating into the outside air.

The supporting means is formed on its inside with an electrically insulating lining, e.g., a rubber lining.

The rubber lining prevents electrical sparks from flashing-over between the electrode and the supporting means.

A still further electrically insulating lining, is provided at the aperture for the electrode formed in an upper flange associated with the rotation supporting means, to prevent sparks from flashing over between the electrode and the rotation supporting means.

Normally three electrodes e.g. for three phase current are regularly distributed in a circle on the furnace head. Their longitudinal axes are arranged to converge towards a common point of intersection which lies on the centre axis of the furnace head. The centre axis of the furnace head and the longitudinal axis of an electrode are inclined at an angle of between 45° and 5° with respect to each other, preferably between 20° and 8°.

The apparatus of the present invention is shown diagrammatically in the accompanying drawings, wherein:

FIG. 1a is a sectional view of the power means for the embodiment of the invention shown in FIG. 1;

FIG. 2 is a side elevational view of the upper portion of the apparatus shown in FIG. 1, showing the parts of a feeding mechanism acting on the electrode;

FIG. 3 is a longitudinal sectional view of the lower portion of a contact holder and an adapter sleeve which the apparatus includes;

FIG. 4 is a sectional view in the direction of the arrow in FIG. 3, and

FIG. 5 is a top sectional view on an enlarged scale of a tongue associated with the contact holder.

Figure 1:
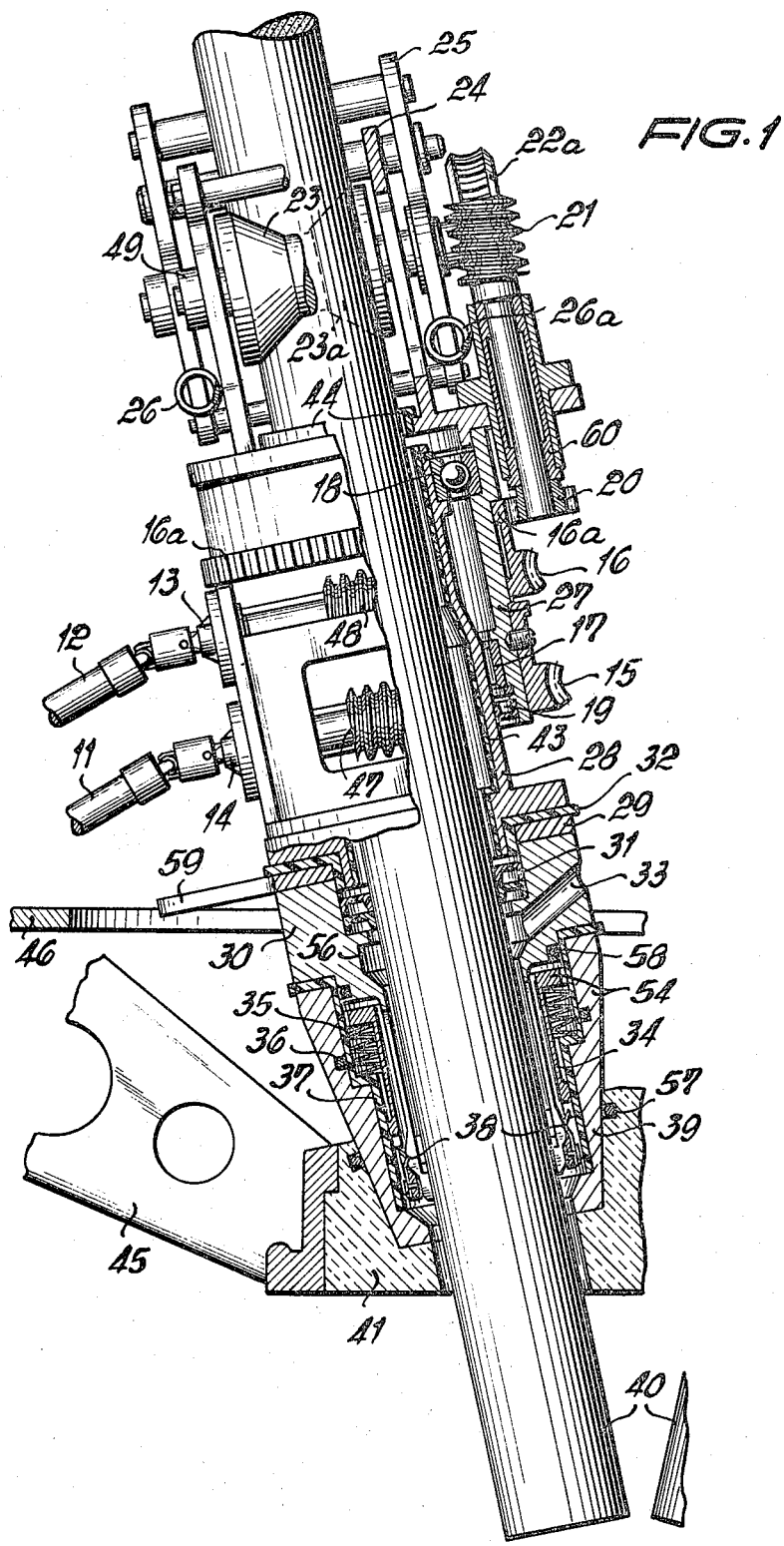
FIG. 1 is a front elevational view, partially in longitudinal section of apparatus in accordance with the invention for a single electrode.

The apparatus of the present invention is conveniently used in those cases in which amongst the various possibilities offered for generating the calorific energy necessary for a heat-consuming cracking reaction, preference is given to the transformation of electrical energy into heat in an arc system. In accordance with the most recent art in this field, there will primarily be employed a so-called heavy current carbon arc fed with three-phase current, established between consumable carbon electrodes which are simultaneously caused to rotate about their longitudinal axes, but operation with DC or AC is also possible.

For a converted power of 2500 kw. such an arc system is equipped e.g. with three highly graphitized carbon electrodes each 70 mm. wide with the edges of the electrode frontal surface areas, where the arc is formed, being spaced about 12 mm. apart during operation.

In an apparatus designed in accordance with the present invention the arc burning chamber (not shown in the drawing) has a furnace head 41 mounted thereon which receives three electrodes 40, regularly arranged in a circle and forming an electrode system. Each of these electrodes has associated therewith means in accordance with the present invention which means are mechanically independent of each other.

In a conically shaped receptacle formed in furnace head 41 with an associated packing ring 57 is mounted holder supporting means 39, which is a hollow structure, preferably made of non-magnetic material, and covered on its inside with an electrically insulating lining 37 formed for example of hard-paper or hard tissue laminated with a thermoplastic resin. Packing ring 36 avoids gas penetration.

Mounted on the holder supporting means 39 in coaxial arrangement therewith and electrically insulated therefrom is a contact holder 30 which may be made of copper and is formed with a packing ring 58 to avoid the access of gas. The contact holder 30 has a lower thin-walled portion which projects deeply into the holder supporting means 39 and is formed with parallel longitudinal slits 51 (see FIGS. 3 and 4). The lower portion of the contact holder is formed with a surrounding edge 50 receiving a conical pressure exerting surface 52, the edge 50 being formed with slits analogous to longitudinal slits 51 and being formed on the inside of flexible tongues 55 left between the longitudinal slits 51 with convex contact surfaces 42, which are arranged in groups of three to ensure reliable contact (three point bearing).

An adapter sleeve 34 made of non-magnetic material, e.g. stainless steel, surrounds and is spaced from the lower thin-walled portion of contact holder 30. The lower rim of adapter sleeve 34 is formed with an inside ring 53 and with a conical pressure exerting area corresponding to that formed on part 50. The outside of ring 53 carries in regular annular distribution pretensioned leaf or plate springs 38 which force the tongues 55 with the contact surfaces 42 into elastic contact with the electrode.

The upper portion of the adapter sleeve 34 is designed as an external flange with pressure being exerted against its underside by an annular or cup spring 35 which surrounds the adapter sleeve 34 and rests on a shoulder formed on the electrically insulated (by lining 37) inside of holder supporting means 39. This arrangement ensures very uniform and reliable contact even when the dimensions or the surface of the electrode 40 fail to correspond accurately to the nominal values.

The upper portion of contact holder 30 closingly seated in the electrically insulated lining of holder supporting means 39 is formed with an annular chamber 56 which has a bore 33 projecting outwardly. Gas supplied through the bore 33, e.g. pure or carbon-containing hydrogen, flows along the electrode 40 to envelop the same, and thence into the arc burning chamber.

A bore formed above the annular chamber 56 in contact holder 30 has packing rings 31, preferably lip packing rings, inserted between the electrode 40 and the contact holder 30, which are intended to prevent gas from issuing upwardly.

Electrically connected to the contact holder 30 is a current supply ring 29 which is preferably formed with a connecting butt strap 59.

An inserted electrically insulating disk with a collet 32 is surmounted by supporting means 28 placed coaxially in contact holder 30. The supporting means 28 is an axially symmetrical hollow body which has an overall length electrically insulating inside lining 43, e.g. a rubber lining. The supporting means 28 perform the function of supporting and guiding rotation supporting means 27 slipped over it. The rotation supporting means is disposed so as to be coaxially rotatable with the aid of roller bearings 17 and 18, around the stationary supporting means 28 with a packing ring 19 being disposed in the annular gap left between the lower end of the rotation supporting means 27 and the means 28.

A worm ring 15 is coaxially fastened to the lower end of the rotation supporting means 27, the worm ring 15 being arranged to be driven by a worm 47 which has a shaft 14. By these means the whole rotation supporting means 27, together with the members secured thereto including the electrode 40, is caused to rotate once the shaft 14 is turned.

Rotatably secured to the rotation support means 27, above the worm ring 15 is a second worm ring 16 formed integrally with a toothed ring 16a. The worm ring 16 is arranged to be driven by a worm 48 having a shaft 13, for feeding the electrode as explained below.

The upper portion of the rotation supporting means 27, except the opening for the electrode 40, is closed. The opening is formed with an electrically insulating lining 44 to avoid electrical flashing-over.

A roll frame 24 is mounted on the upper portion of the rotation supporting means 27 to provide support for a worm wheel 22 and a feed roll 23 which are fast with a shaft 49 mounted in the frame 24. A second roll frame 25 is pivotally secured to the frame 24, to provide support for a second worm wheel 22a and a second feed roll 23a fast with a shaft 49a mounted in the frame 25. The two worm wheels 22 and 22a are arranged to be engaged with a worm 21 whose shaft slides in a sleeve 60 and whose lower end carries a toothed pinion or gear 20 engaged with the toothed ring 16a.

Since the frames 24 and 25 together with the sleeve 60 are arranged to be carried round by the rotation supporting means 27 when the latter is rotated, no feed motion is produced when there is no relative rotation between the rotation supporting means 27 and the toothed ring 16a, since rotation of the pinion or gear 20 about its own axis will not then be produced. A feed motion in one direction or other is however produced when relative rotation between these parts does occur.

The pivotal connection of the frame 25 to the frame 24 enables the frame 25 to be pivoted outwardly to move the worm wheel 22a out of engagement with the worm 21 and the feed roll 23a out of engagement with the electrode 40 to facilitate removal thereof. Tension springs 26 and 26a normally maintain the frame 25 in the position shown so that the electrode is gripped between the two feed rolls 23 and 23a.

The feed rolls 23 and 23a are profiled to have the shape approaching that of two truncated circular cylindrical cones arranged coaxially with respect to one another, with their ends of smaller diameter adjacent each other, a short circular cylindrical portion preferably, as is shown, being provided between them. The profile shape conferred upon feed rolls 23 and 23a approaches that of a one sheet hyperboloid of revolution. The shape of the feed rolls ensures that the electrode is accurately centered.

The feed rolls 23 and 23a are provided on their profiled surface areas with an electrically insulating lining such as to provide sufficient friction between them and the electrode to ensure that the latter is firmly held.

The prime movers or drive means for producing rotation and feed of the electrode are mounted on an annular base plate 46 which surrounds and is spaced from the furnace head 41 and secured thereto by means of brackets 45.

Power for the rotary motion is derived from a motor 8 to which a shaft 9 is coupled and which through an articulated shaft 11 drives the shaft 14 of the worm 47 which via the worm ring 15 causes the rotation means 27 together with the electrode 40 to rotate.

Power for the feed motion is derived from a motor 1 arranged to drive a worm 2 which in turn drives a worm wheel 3 rotatably mounted on a drive shaft 7, the worm wheel 3 being formed with an internally toothed rim 3a. A wheel 5, rotatably mounted on a hub extension of a sun wheel 6 fast with the shaft 7, carries planet pinions 4 which mesh both with the internally toothed rim 3a and teeth on the sun wheel 6. The wheel 5 is provided with teeth arranged to mesh with a pinion 10 fast with the drive shaft 9. Drive from the shaft 7 is transmitted through an articulated shaft 12 to the shaft 13 of the worm 48.

The electrodes 40 are extended through the furnace head 41 at regular distances from the bottom. Their longitudinal axes converges toward a common point of intersection on the centre axis of the furnace head 41.

The central longitudinal axes of the electrodes are inclined at angles of between 45 and 5°, and preferably between 20 and 8° with respect to the central longitudinal axis of the furnace.

The features described and claimed herein have proved necessary to ensure uniform and undisturbed operation of an arc. Reliable centering of the electrodes is a particularly important feature as very minor eccentricity of rotating electrodes will result in unsatisfactory control of the electrode feed motion.

The solution of the problem by the means of this invention has proved efficient both from technical and economic aspects.

We claim:

1. Apparatus for rotating and feeding consumable arc supporting electrodes comprising for each electrode means to hold an electrode including a supporting means electrically insulated therefrom, a rotation supporting means rotatably mounted on the supporting means and mounting means for holding, feeding and rotating the associated electrode and, for each electrode a pair of prime movers connected to a common differential gear unit from which the electrode rotating and feeding means are driven.

2. Apparatus as claimed in claim 1, wherein the prime movers comprise two motors, one motor driving through a worm a worm gear rotatably mounted on a drive shaft, the worm gear carrying in coaxial arrangement therewith an internally toothed rim, in which run planet pinions held in position by an externally toothed wheel rotatably mounted on a sun wheel with which the pinions also mesh, the sun wheel being fast with the drive shaft, and the second motor being coupled to a drive shaft which carries a pinion made fast thereto and which is arranged to mesh with the externally toothed wheel which carries the planet pinions, rotation of the drive shaft of the second motor being arranged to cause rotation of the electrode, and appropriate rotation of the drive shaft of the first motor being arranged to feed the electrode.

3. Apparatus as claimed in claim 1, wherein for imparting a rotary motion to the electrode the rotation supporting means has a worm ring secured thereto, in coaxial arrangement, arranged to be driven by a worm.

4. Apparatus as claimed in claim 1, wherein for imparting a feed motion to the electrode the rotation supporting means has rotatably secured thereto a worm ring arranged to be driven by a worm with which a coaxial gear rim is fast arranged to be engaged by a pinion mounted on a shaft carrying a further worm, engaged with the two worm gears to whose shafts are secured opposed feed rolls acting on the electrode.

5. Apparatus as claimed in claim 4, wherein one shaft carrying one of the worm gears and one of the feed rolls is mounted in a frame fastened to the rotation supporting means and a second shaft carrying the second worm gear and the second feed roll is mounted in a second frame pivotally secured to the first frame, and two tension springs are provided the ends of which are secured to the first and second frames, respectively, to hold the feed rolls in contact with the electrode.

6. Apparatus as claimed in claim 4, wherein the feed rolls are profiled to have the shape of two coaxial truncated circular cylindrical cones, with their ends of smaller diameter adjacent each other and the feed rolls are provided with an insulating coating.

7. Apparatus as claimed in claim 6, wherein the profiled feed rolls are spaced apart by a short circular cylindrical member.

8. Apparatus as claimed in claim 1, in which each electrode is provided with a holder supporting means formed with an electrically insulating lining and mounted in conical receiving means, the holder supporting means carrying a coaxially associated contact holder, having a lower thin-walled portion formed with a surrounding edge carrying a conical pressure-exerting area, the lower thin-walled portion being formed with parallel longitudinal slits, and being formed on its inside with contact surface areas arranged in groups of three.

9. Apparatus as claimed in claim 8, wherein the lower end of the contact holder has spaced therefrom a surrounding coaxial adapter sleeve, a lower rim portion of which is shaped so as to form an internal ring and is provided with a conical pressure area, and whose upper rim portion is designed as an external flange with the lower flange side resting on one end of a cup spring which surrounds the adapter sleeve and of which the other end bears against a shoulder formed on the inside of the holder supporting means, the inside being electrically insulated by a lining.

10. Apparatus as claimed in clamed 8, wherein the internal ring formed in the lower end of the adapter sleeve has pretensioned plate springs secured thereto which force tongues formed between the longitudinal slits in the lower portion of the contact holder, and the convex contact areas into elastic contact with the electrode.

11. Apparatus as claimed in claim 8, wherein for supplying gas to flow along the electrode and to be heated in the electric arc, the contact holder is formed with a radial bore followed by a series-connected annular chamber with packings being disposed above the annular chamber between the contact holder and the electrode.

12. Apparatus as claimed in claim 1, wherein a packing ring is disposed between the holder supporting means and the conical receiving means, a further packing ring is disposed between the electrically insulating lining of the holder supporting means and the holder supporting means, and a still further packing ring is disposed between the electrically insulating lining of tthe holder supporting means and the contact holder.

13. Apparatus as claimed in claim 1, wherein the inside of the first mentioned supporting means is formed with an electrically insulating lining.

14. Apparatus as claimed in claim 1, wherein an opening for the electrode, in an upper flange of the rotation supporting means is formed with an electrically insulating lining.

15. Apparatus as claimed in claim 1, wherein the electrodes are regularly arranged in a circle with their longitudinal axes coverging towards a common point of intersection, the longitudinal axes of the electrodes being inclined at an angle of between 45 and 50°, with respect to an axis passing through the centre of the circle and the point of intersection.

16. An apparatus as claimed in claim 15, wherein the axes of the electrodes are inclined at an angle of between 20 and 8° with respect to an axis passing through the centre of the circle and the point of intersection.

References Cited

UNITED STATES PATENTS

| | | | |
|---|---|---|---|
| 2,453,175 | 11/1948 | Youngson, et al. | 314—40 |
| 2,771,498 | 11/1956 | Bredtschneider et al. | 13—14 |

BERNARD A. GILHEANY, *Primary Examiner.*

R. N. ENVALL, JR., *Assistant Examiner.*